(12) United States Patent
Singh et al.

(10) Patent No.: US 10,849,280 B2
(45) Date of Patent: Dec. 1, 2020

(54) RIGS FOR ILLUMINATING FIELDS AND METHODS OF ILLUMINATING PLANTS

(71) Applicant: ALMENDRA PTE. LTD., Singapore (SG)

(72) Inventors: Inder Singh, Bangkok (TH); Aslan Tomov, Bangkok (TH)

(73) Assignee: ALMENDRA PTE. LTD., Singapore (SG)

(*) Notice: Subject to any disclaimer, the term of this patent is extended or adjusted under 35 U.S.C. 154(b) by 0 days.

(21) Appl. No.: 16/185,182

(22) Filed: Nov. 9, 2018

(65) Prior Publication Data

US 2020/0084976 A1 Mar. 19, 2020

Related U.S. Application Data

(62) Division of application No. 14/913,703, filed as application No. PCT/IB2014/001948 on Aug. 27, 2014, now Pat. No. 10,231,385.

(Continued)

(51) Int. Cl.
*A01G 7/04* (2006.01)
*A01G 25/09* (2006.01)

(52) U.S. Cl.
CPC .............. *A01G 7/045* (2013.01); *A01G 25/09* (2013.01); *Y02P 60/146* (2015.11)

(58) Field of Classification Search
CPC ....... Y02P 60/146; A01G 9/249; A01G 7/045; A01G 25/09; G06Q 50/02
See application file for complete search history.

(56) References Cited

U.S. PATENT DOCUMENTS 3,235,009 A 2/1966 Nelson
5,040,329 A * 8/1991 Michaloski ............ A01G 7/045
47/1.1

(Continued)

FOREIGN PATENT DOCUMENTS

CN 201911118 8/2011
GB 2382014 5/2003

(Continued)

OTHER PUBLICATIONS

Office Action for Brazil Patent Application 1120160043502 dated Jul. 23, 2019.

(Continued)

*Primary Examiner* — Erin Kryukova
(74) *Attorney, Agent, or Firm* — Thomas | Horstemeyer LLP

(57) ABSTRACT

Disclosed are various embodiments for a mobile rig configured to control a photoperiodic response of a photoperiodically sensitive plant subject (e.g., a short-day plant) planted in an open field. The mobile rig includes a support structure; wheels; and light sources attached to the support structure at a position for emitting light on an upper surface of the photoperiodically sensitive plant subject. The mobile rig includes or is coupled to a control circuit having processing circuitry configured to cause the mobile rig to navigate across an open field having the photoperiodically sensitive plant subject planted therein and selectively illuminate the photoperiodically sensitive plant subject using the light sources attached to the mobile rig, for instance, during nighttime hours in a wavelength range between approximately 250 nm and approximately 800 nm to control the photoperiodic response of the photoperiodically sensitive plant subject planted therein.

18 Claims, 2 Drawing Sheets

Related U.S. Application Data

(60) Provisional application No. 61/870,358, filed on Aug. 27, 2013.

(56) References Cited

U.S. PATENT DOCUMENTS

| | | | |
|---|---|---|---|
| 5,222,324 | A | 6/1993 | O'Neal et al. |
| 6,921,182 | B2 | 7/2005 | Anderson et al. |
| 7,905,052 | B2 | 3/2011 | Hurst et al. |
| 8,299,445 | B2 | 10/2012 | Yamada et al. |
| 9,480,207 | B2 | 11/2016 | Tanase et al. |
| 10,292,340 | B2 * | 5/2019 | Berinsky ............ A01G 7/045 |
| 2001/0035468 | A1 * | 11/2001 | Santa Cruz ......... A01G 7/045 239/726 |
| 2007/0089359 | A1 | 4/2007 | Okabe et al. |
| 2009/0272029 | A1 | 11/2009 | Aiking et al. |
| 2010/0039804 | A1 | 2/2010 | Budde et al. |
| 2010/0175318 | A1 * | 7/2010 | Ahmadi ............ A01G 7/045 47/66.6 |
| 2010/0193707 | A1 | 8/2010 | Yamada et al. |
| 2010/0289411 | A1 * | 11/2010 | Smits ............... A01G 7/045 315/113 |
| 2012/0043907 | A1 | 2/2012 | Lu et al. |
| 2013/0000185 | A1 | 1/2013 | Tanase et al. |
| 2013/0145688 | A1 | 6/2013 | Tatsumi et al. |
| 2013/0255150 | A1 | 10/2013 | Karpinski et al. |
| 2014/0165462 | A1 | 6/2014 | Shigyo et al. |

FOREIGN PATENT DOCUMENTS

| | | |
|---|---|---|
| JP | 5017478 B1 | 11/2012 |
| WO | 2005013673 | 2/2005 |
| WO | 2011086499 | 7/2011 |
| WO | 2011154522 | 12/2011 |
| WO | 2012147391 | 11/2012 |

OTHER PUBLICATIONS

Office Action for Peruvian Patent Application No. 291-2016/DIN dated Jul. 24, 2019.
Mexican Office Action for PCT/2016/002211, dated Jan. 25, 2019.
Republic of Indonesia Office Action for Application No. P00201601944 entitled "Rigs for Illuminating Fields and Methods of Illumination Plants," dated Dec. 17, 2018.
European Office Action (EP14789368.9) for PCT/IB2014/001948 dated Oct. 8, 2018.
Chinese Office Action (CN2014800475140) for PCT/IB2014/001948 dated Dec. 8, 2017.
Australian Examination Report for Australian Application No. 2014313857 dated Apr. 7, 2017.
International Search Report for PCT/IB2014/001948 dated Dec. 12, 2014.
Chinese Office Action (CN2014800475140) for PCT/IB2014/001948 dated Aug. 14, 2018.
Office Action for Chinese Patent Application 2014800475140 dated Jul. 3, 2019.
MY Office Action dated Oct. 9, 2019 for Malaysian Patent Application No. PI2016000357.
CN Office Action dated Sep. 29, 2019 for Chinese Patent Application No. 201480047514.0.
BR Office Action dated Mar. 17, 2020 for Brazilian Patent Application No. 112016004350.
BR Office Action dated Jul. 21, 2020 for Brazilian Patent Application No. 112016004350.

* cited by examiner

RIGS FOR ILLUMINATING FIELDS AND METHODS OF ILLUMINATING PLANTS

CROSS-REFERENCE TO RELATED APPLICATIONS

This application is a divisional of U.S. patent application Ser. No. 14/913,703 entitled "RIGS FOR ILLUMINATING FIELDS AND METHODS OF ILLUMINATING PLANTS," filed Feb. 23, 2016, which is a 35 U.S.C. § 371 national phase application of PCT Publication No. PCT/162014/001948, filed Aug. 27, 2014, each of which claiming the benefit of and priority to U.S. Provisional Patent Application No. 61/870,358 entitled "RIGS FOR ILLUMINATING FIELDS AND METHODS OF ILLUMINATING PLANTS," filed on Aug. 27, 2013, the contents of each being incorporated by reference in their entirety herein.

BACKGROUND

The subject of photoperiodism concerns the influence of light and dark periods in the daily cycles of 24 hours on the living processes in plants. Photoperiod refers to the duration, i.e., length of the time of exposure to light, in other words, illumination period in daily cycle of 24 hours. Generally speaking photoperiodic response refers to any morphological, anatomical or physiological response produced in a plant by exposure to some particular photoperiodic cycles (e.g., periods of darkness). Flowering is one of such photoperiodic responses that plants may exhibit. It is important to note, however, that photoperiodic response in a photoperiodically sensitive plant is largely dependent on the duration of darkness experienced by the plant during a 24 hour cycle.

In particular, qualitative (i.e., obligate) short-day plants are such plants that necessarily flower as nights (i.e., dark periods) exceed a certain critical length. In nature this happens when days become shorter as the seasons develop and the year progresses towards the end, especially when the plants grow outside of the equatorial belt (within which the days and nights are of approximately the same duration and the night length does not vary much). On the contrary, long-day and especially qualitative (i.e., obligate) long-day plants will flower only when the nights are shorter than a certain critical length.

An irrigation rig is a device employed in irrigation or farming whereby the device provides plants and crops with water via sprinklers. The irrigation rig may automatically move from a first location to a second location while watering the plants and crops as the irrigation rig moves.

BRIEF SUMMARY OF INVENTION

Embodiments of the present disclosure provide for mobile irrigation rigs, system for illuminating plants, methods of illuminating plants, and the like. One exemplary embodiment of a system configured to control a photoperiodic response of at least one photoperiodically sensitive plant subject planted in an open field, among others, includes a mobile rig. The mobile rig may include a support structure; a plurality of wheels; a plurality of light sources attached to at least the support structure at a position for emitting light on an upper surface of the at least one photoperiodically sensitive plant subject; and a control circuit.

The control circuit may include processing circuitry configured to: cause the mobile rig to navigate, using the wheels, across an open field having the at least one photoperiodically sensitive plant subject planted therein; and selectively illuminate the at least one photoperiodically sensitive plant subject using the plurality of light sources attached to the mobile rig during nighttime hours in a wavelength range between approximately 250 nm and approximately 800 nm while the mobile rig navigates the open field to control the photoperiodic response of the at least one photoperiodically sensitive plant subject planted therein, wherein photoperiodically sensitive plant subject is a short-day plant and selectively illuminating the short-day plant is performed periodically during nighttime hours such that the short-day plant is not subject to nighttime light conditions for more than about 12 hours, about 10 hours, about 8 hours, or about 6 hours.

The mobile rig may further include an irrigation system positioned thereon, the irrigation system comprising a plurality of sprinklers; and the processing circuitry of the control circuit is further configured to selectively illuminate the at least one photoperiodically sensitive plant subject after a recent irrigation of the at least one photoperiodically sensitive plant subject performed using the irrigation system. The processing circuitry of the control circuit may be further configured to selectively illuminate the short-day plant comprises selectively illuminating the short-day plant with a flash of light of about 1 millisecond, about 1 second, about 2 minutes, about 3 minutes, about 5 minutes, about 10 minutes, about 15 minutes, or about 30 minutes.

The processing circuitry of the control circuit may be further configured to selectively control the photoperiodic response of the at least one photoperiodically sensitive plant subject using the plurality of light sources by selectively emitting the light in the wavelength range for about 3 minutes to about 15 minutes. Additionally, the processing circuitry of the control circuit may be further configured to selectively control the photoperiodic response of the at least one photoperiodically sensitive plant subject to prevent a blooming of the at least one photoperiodically sensitive plant subject and keep the at least one photoperiodically sensitive plant subject in a vegetative state.

The short-day plant may include, among others, at least one of: *Stevia rebaudiana, artemisia annua, oryza, crocus sativus, chrysanthemum* (morfolium), *dendranthema grandiflora, kalanchoe blossfeldiana, euphorbia pulcherrima, pharbitis* nil, *Cannabis sativa, glycine max, xanthium strumarium*, and *saccharum*.

The light sources may include light emitting diode (LED) light sources, the LED light sources being at least one of: polarized, plane-polarized, circularly polarized, elliptically polarized, unpolarized, and collimated. The processing circuitry of the control circuit may be further configured to cause the mobile rig to move in the open field at a constant rate; and control the constant rate at which the mobile rig is moved, wherein the constant rate is determined as a function of a design of the mobile rig, the light sources, an intensity of the light sources, a type of the short-day plant, and current nighttime conditions.

The processing circuitry of the control circuit may be further configured to cause the mobile rig to move at from a first position to a second position in the open field and remain idle at the second position for a period of time before causing the mobile rig to move to a third position. The support structure may include a main rig arm, the light sources being coupled to an underside of the main rig arm.

BRIEF DESCRIPTION OF THE DRAWINGS

Many aspects of the present disclosure can be better understood with reference to the following drawings. The FIG. 1 is a drawing of an irrigation rig comprising a plurality of light sources according to various embodiments of the present disclosure.

DETAILED DESCRIPTION

Figure 1:
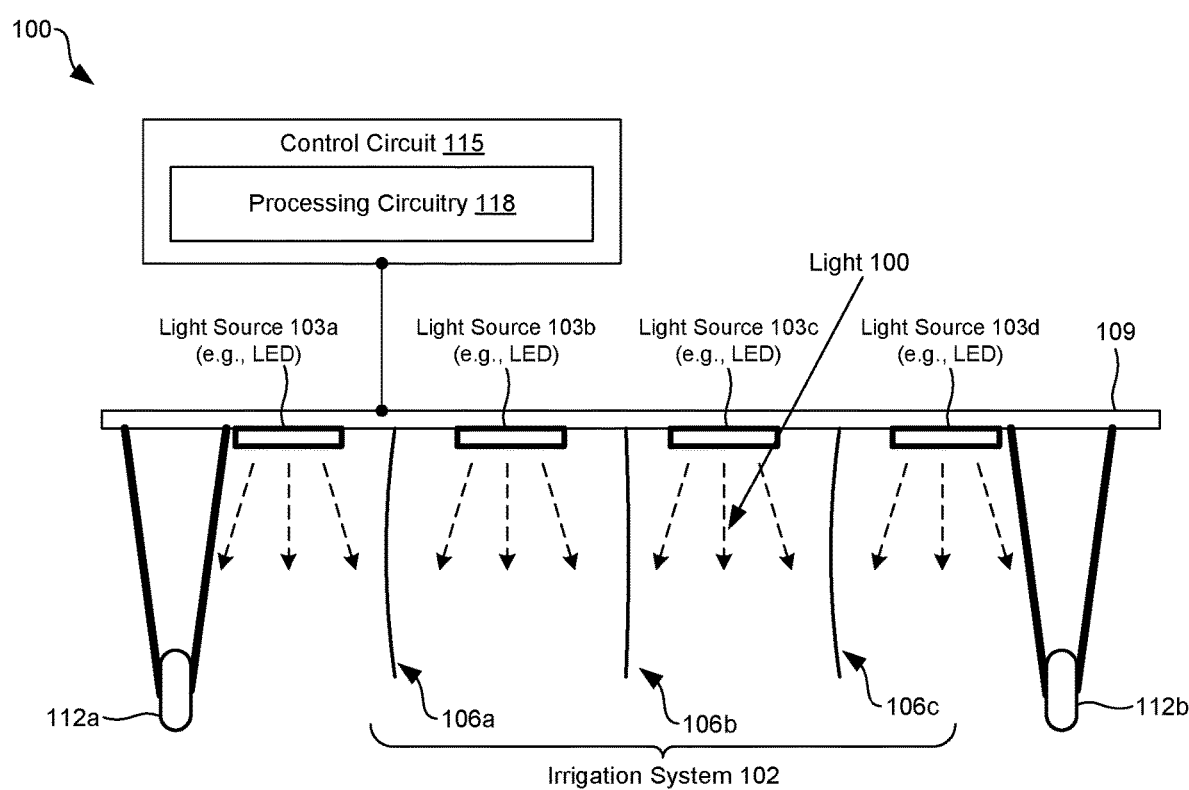

The present disclosure relates to rigs and methods of illuminating short-day plants and, in some embodiments, qualitative (i.e., obligate) short day plants. According to various embodiments, the disclosure described herein may be used to control the photoperiodic response of other types of photoperiodically sensitive plants including quantitative short day plants, qualitative long day plants, etc. Before the present disclosure is described in greater detail, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of agriculture, botany, and the like, which are within the skill of the art. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

In describing and claiming the disclosed subject matter, the following terminology will be used in accordance with the definitions set forth below. The phrase "short-day plant" refers to *Stevia rebaudiana*, *Artemisia annua*, *Oryza* (e.g., rice), *Crocus sativus*, *Chrysanthemum* (morfolium), *Dendranthema grandiflora*, *Kalanchoe blossfeldiana*, *Euphorbia pulcherrima*, *Pharbitis nil*, *Cannabis sativa*, *Glycine max*, *Xanthium strumarium*, *Saccharum* (e.g., sugarcane), and other similar plants.

Qualitative (i.e. obligate) short-day plants are plants that necessarily flower as the night (i.e. dark periods) exceed a certain critical length. In nature this happens when days become shorter as the seasons develop and the year progresses towards the end, especially when the plants grow outside of the equatorial belt (within which the days and nights are of approximately the same duration and the night length does not vary much). On the contrary, long-day and especially qualitative (i.e. obligate) long-day plants will flower only when the nights are shorter than a certain critical length.

Photoperiodically sensitive plants may be freely manipulated (e.g., triggered or delayed) by exposing such plants to artificially produced light signals of specific wavelengths during the nights. However, there is no reliable and commercially attractive method of such manipulation of different types of photosensitive plants grown in the commercial open fields and most experiments were confined to greenhouses or other such controller settings. Embodiments of the present disclosure can solve this problem by using rigs in the open field to manipulate the photoperiodically sensitive plants.

Embodiments of the present disclosure provide for rigs, systems, and methods of illuminating short-day and/or long-day plants. These embodiments may be advantageous since it is helpful to control blooming of plants (e.g., keep them in the vegetative state or induce flowering if that is most commercially desirable) while growing them in the open fields.

For example, short-day plants bloom when they are under nighttime conditions for a period of time (e.g., greater than about 8, about 9, about 10, about 11, or about 12 hours or more). In various embodiments, the rig (e.g., a mobile irrigation rig) can include a plurality of light sources that can be used to illuminate (also referred to as "light treatment") short-day plants during the nighttime hours (e.g., low or no sunlight) so that the short-day plants do not register nighttime light conditions, which may otherwise start the blooming cycle. As a result, the short-day plants do not bloom and remain in the vegetative state for longer periods of time. Alternatively, the same mechanism may be used to induce flowering in some short-day plants just by exposing them to a different range of red light. Furthermore, the same arrangements and approaches may be used to manipulate the flowering of long-day plants.

From the top-down view, the embodiments described herein permit control of the photoperiodic response (e.g., flowering) of photosynthetically sensitive plants (e.g., short-day obligate plants, long-day obligate plants, etc.) while growing in large-scale commercial open fields (e.g., tens of hectares or more), thus helping to optimize the relevant harvesting times and yields. In other words, the established photoperiod control tools are brought into the open fields.

For example, it is desirable to delay blooming of *Stevia rebaudiana* since the commercially valuable chemical components of the plant (e.g., steviol glycosides) are reduced once the plant starts to bloom. Keeping *Stevia rebaudiana* in the vegetative state allows for the steviol glycosides to accumulate and from development of larger leaf mass. As a result, illuminating short-day plants, such as *Stevia rebaudiana*, once or more during nighttime hours for short periods of time (e.g., about 3 to 5 minutes) prevents or substantially prevents the short-day plants from blooming, thus increasing the value of the short-day plant.

In the case of Saffron it is desirable to manage its blooming time by forcing it to flower when it is physiologically ready and is most commercially suitable rather than wait for the right season to come.

Further, some examples of long-day plants for which the disclosure herein may be applied to include *Trifolium pratense* (red clover), *Rudbeckia* bicolor, *Solanum tuberosum* L. (potato), *Beta vulgaris* (sugar beet), *Spinacia oleracea* (spinach), *Brassica napus* L. (oilseed rape, oil source for canola) *Avena sativa* (oats).

In addition, using a rig outfitted with a plurality of light sources is easily adapted to current outdoor growing methods. For example, a rig used in irrigation can also include a plurality of light sources so that currently used infrastructure can be used to illuminate the short-day plants during nighttime hours.

In an embodiment, the light can be polarized, plane-polarized, circularly polarized, elliptically polarized or unpolarized, or collimated (e.g., in a laser beam).

In an embodiment, light treatment can involve one or a combination of different light frequencies of polarized or unpolarized light from the violet, the red and far-red spectral bands in a range of light intensities appropriate for the type of short-day plant. In an embodiment, the red light may be about 600 nm to 800 nm and the violet light may be about 250 nm to 400 nm. In another embodiment, the red light may be about 600 nm to 700 nm. The final spectral combination necessary for the extension of the vegetative state or, to the contrary, induction of flowering is specific to a given species but is well-defined and is quite narrow. In a particular embodiment, the light may be about 630 nm to 660 nm or about 730 to 780 nm. For example, *Stevia* can be illuminated at about 660 nm light for a period of time to prevent blooming, whereas strawberry may also need some violet light treatment as well. The wavelength range and intensity used can be selected based on the type of short-day plant, environmental conditions, the required photoperiodic response or its absence and the like.

As mentioned above, a rig can include a plurality of light sources attached to the rig (e.g., main rig arm). The rig can include a linear rig or a pivoting rig, both of which are mobile. In an embodiment, the rig is an irrigation rig that includes a sprinkler system. In the following discussion, a general description of the system and its components is provided, followed by a discussion of the operation of the same.

With reference to FIG. 1, shown is an illustration of an irrigation rig 100, which can be part of a water irrigation system 102 for a field of short-day plants, according to various embodiments of the present disclosure. The irrigation rig 100 includes a plurality of light sources 103a . . . 103d (collectively light sources 103), a plurality of sprinklers 106a . . . 106c (collectively sprinklers 106), a support structure 109 (e.g., a main rig arm) for the light sources 103 and sprinklers 106. In various embodiments, the irrigation rig 100 may comprise a plurality of wheels 112a . . . 112b (collectively wheels 112) so that the water irrigation system 102 can be a mobile system. Further, the irrigation rig 100 may comprise, or may be communicatively coupled, to a control circuit 115 comprising processing circuitry 118 configured to control an operation of the light sources 103, the sprinklers 106, and/or an operation of the wheels 112. As mentioned above, the specific design of the irrigation rig 100 can be altered or vary depending on various factors. For example, for short-day plant crops that use an alternative irrigation system, a mobile rig, similar to the irrigation rig 100 without the sprinkler system, can be used to illuminate the short-day plants.

The light sources 103 can be positioned on the irrigation rig 100 so as to maximize the light treatment of the short-day plants. The spacing along the length of the irrigation rig 100 and/or the height above the short-day plants can be tailored to the specific design of the irrigation rig 100, the type(s) of short-day plant crop, the environmental conditions, and the like. In an embodiment, the light source 103 can include an LED, a solid state plasma lamp, a high-intensity discharge (HID) lamp, a fluorescent lamp, an incandescent lamp, a sulfur lamp, and/or a laser so long as the selected light source emits light in the desired wavelength (e.g., about 600 nm to 800 nm, about 250 nm to 400 nm). In an embodiment the irrigation rig 100 can include 1 to 100s of light sources 103 depending on the size of the irrigation rig 100.

In a particular embodiment, the light source 103 is an LED, where the wavelength of the light emitted can be selected based on the type of short-day plant. As mentioned above, *Stevia* should be illuminated at about 660 nm light for a period of time to prevent blooming and keep the plant in the vegetative state, so an LED can be used that emits light at about 660 nm. In an embodiment, more than one type to LED can be used in the light source so that the light source emits light at a number of wavelengths, which might be advantageous for situations where multiple wavelengths are needed to achieve the desired goal.

In another embodiment, one or more filters (not shown) can be used in conjunction with light sources 103 that emit light over a broad range of wavelengths so that only desired wavelengths reach the short-day plants. As is evident from the foregoing discussion, the specific design of the irrigation rig 100 can vary significantly based on the desired goals to be achieved, and the various designs, even if not specifically recited, are intended to be covered by the present discussion and the claims of the present disclosure.

Figure 2:
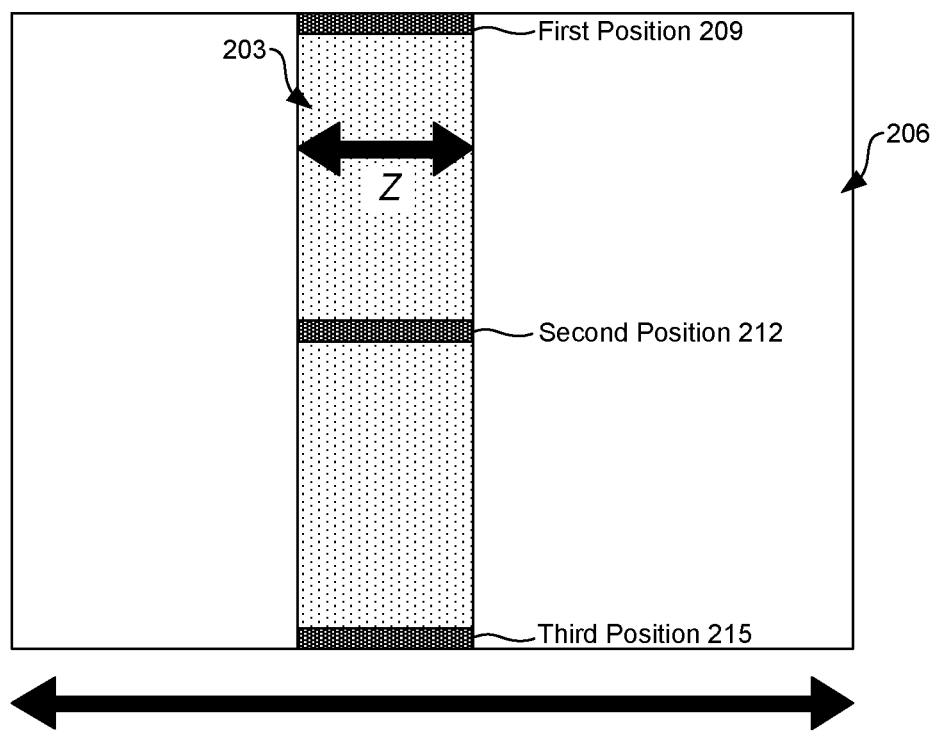
FIG. 2 is a drawing illustrating a field to facilitate light computations using the irrigation rig of FIG. 1 according to various embodiments of the present disclosure.

Moving on to FIG. 2, shown is a drawing illustrating a field to facilitate light computations, as will be described below. For example, it may be beneficial to compute a width of a beam of a light source 103 (FIG. 1) and a speed at which a light beam 203 (e.g., emitted from the light source 103) needs to travel across a field 206. Given the equation:

$$Z = V \times t \text{ (meters)} \quad (EQ. 1)$$

where V is the velocity of the light beam 203 (in meters per minute), t is the plant illumination time, and Z is the light beam width (in meters), the width of a beam can be calculated when V and T are known. Given the equation:

$$V = \frac{L}{T} \text{ (meters per minute)} \quad (EQ. 2)$$

where L is a length of the field 206 (in meters) and T is the time it takes for the light beam 203 to travel across the field 206, the speed at which the light beam 203 needs to travel so that all plants in the field 206 are illuminated with a stipulated time may be calculated.

In an embodiment, the method of illuminating short-day plants includes periodically illuminating the plants during the nighttime hours (or nighttime light conditions). In an embodiment, nighttime hours can be from about sunset to sunrise or when the short-day plant is said to experience nighttime conditions (e.g., which may occur when light from the sun is less than a certain amount (which varies from plant to plant), which could be prior to sunset or after sunrise). In an embodiment, the illumination can occur one or more times during nighttime hours for about 1 second to 10 minutes or more, which includes all time ranges in increments of thirty seconds therein. Further, a flash of light may be added for more than a millisecond. In an embodiment, the illumination is performed periodically during nighttime hours so that the short-day plant is not subject to nighttime light conditions for more than about 12 hours, about 10 hours, about 8 hours, or about 6 hours. The amount of time a short-day plant can be subject to nighttime light conditions to induce the blooming mechanism varies from plant to plant, so the method of illuminating can be adjusted to correspond to the short-day plant blooming/vegetative cycle.

In an embodiment, the method can include the rig 100 moving in a manner so as to expose the short-day plants in the field 206 to an appropriate amount of light from the light source(s) 103 on the rig to keep the short-day plants in the vegetative state. In an embodiment, the rig 100 can be moved at a constant rate to illuminate the short-day plants with an appropriate amount of light from the light source(s) 103. The rate of movement can be determined based on the design of the rig 100, the light source 103 used, intensity of the light source 103, type of short-day plant, current nighttime conditions, and the like. In another embodiment, the rig 100 is not constantly moving, rather the rig 100 moves to a first position 209 and is idle for a period of time and then moves to another position, for example second position 212 and third position 215, and is idle for a period of time, and this continues until are areas of the entire field 206 has been illuminated. In other words, the rig 100 can be moved a set distance to a certain position in the field 206 to expose the short-day plants in that area to an appropriate amount of light from the light source(s) 103. Subsequently, the rig 100 is moved a set distance to another position in the field 206 to expose the short-day plants in that area to an appropriate amount of light from the light source(s) 103. The movement of the rig 100 can be conducted until the entire field 206 has been exposed to an appropriate amount of light. The time of exposure and/or distance moved can depend upon the design of the rig 100, the light source 103 used, the intensity of the light source 103, the type of short-day plant, and the like.

An experiment to determine the extent to which flowering in a *Stevia* Plant can be delayed by illuminating the plant to a 660 nanometer wave length light (red light). The experiment was setup in a 9 individual, 3 meter by 3 meter cubicle covered with a transparent sheet below which a light source that can produce a light with a wavelength of 660 nanometers was installed. The plant cuttings were planted in pots and were illuminated at midnight every day for a duration of 0 minutes to 10 minutes as indicated in Table 1 below.

TABLE 1

Flowering Response to Exposure Time

| Room Number | Light Power Rating (Watts) | Exposure Time/Day (Mins) | First Bloom - Days After Planting |
|---|---|---|---|
| 1 | 0 | 0 | 55 |
| 2 | 300 | 1 | 59 |
| 3 | 600 | 1 | 61 |
| 4 | 300 | 3 | 72 |
| 5 | 600 | 3 | 73 |
| 6 | 300 | 5 | 97 |
| 7 | 600 | 5 | 101 |
| 8 | 300 | 10 | 121 |
| 9 | 600 | 10 | 125 |

The power of the LED lights was also varied from 300 watts to 600 watts. The cubicle was observed on a daily basis and the first bloom of flower was recorded. The results of Table 1 convincingly show that illuminating the plants with a red light of wave length 660 nanometers has an impact to delay the flowering when compared to the plants that were not illuminated.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to significant figures of the numerical value. In addition, the phrase "about 'x' to 'y'" includes "about 'x' to about 'y'".

It should be emphasized that the above-described embodiments of the present disclosure are merely possible examples of implementations, and are merely set forth for a clear understanding of the principles of this disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A mobile rig configured to control a photoperiodic response of at least one photoperiodically sensitive plant subject planted in an open field, comprising:
   a support structure;
   a plurality of wheels;
   a plurality of light sources attached to at least the support structure at a position for emitting light on an upper surface of the at least one photoperiodically sensitive plant subject; and
   a control circuit comprising processing circuitry configured to:
     control operation of the wheels to cause the mobile rig to travel across the open field having the at least one photoperiodically sensitive plant subject planted therein; and
     selectively illuminate the at least one photoperiodically sensitive plant subject using the light sources attached to the mobile rig during nighttime hours in a wavelength range between approximately 250 nm and approximately 800 nm while the mobile rig navigates the open field to control the photoperiodic response of the at least one photoperiodically sensitive plant subject planted therein, wherein the at least one photoperiodically sensitive plant subject is a short-day plant and selectively illuminating the short-day plant is performed periodically during nighttime hours such that the short-day plant is not subject to nighttime light conditions for more than about 12 hours, about 10 hours, about 8 hours, or about 6 hours.

2. The mobile rig of claim 1, wherein:
   the mobile rig further comprises an irrigation system positioned thereon, the irrigation system comprising a plurality of sprinklers; and
   the processing circuitry of the control circuit is further configured to selectively illuminate the at least one photoperiodically sensitive plant subject after an irrigation of the at least one photoperiodically sensitive plant subject performed using the irrigation system, the irrigation not being performed more than 24 hours prior to the selective illumination of the at least one photoperiodically sensitive plant subject.

3. The mobile rig of claim 1, wherein the processing circuitry of the control circuit is further configured to selectively illuminate the short-day plant by selectively illuminating the short-day plant with a flash of light of about 1 millisecond, about 1 second, about 2 minutes, about 3 minutes, about 5 minutes, about 10 minutes, about 15 minutes, or about 30 minutes.

4. The mobile rig of claim 1, wherein the processing circuitry of the control circuit is further configured to selectively control the photoperiodic response of the at least one photoperiodically sensitive plant subject using the light sources by selectively emitting the light in the wavelength range for about 3 minutes to about 15 minutes.

5. The mobile rig of claim 1, wherein the short-day plant comprises one of: *Stevia rebaudiana, artemisia annua, oryza, crocus sativus, chrysanthemum* (morfolium), *dendranthema grandiflora, kalanchoe blossfeldiana, euphorbia pulcherrima, pharbitis* nil, *Cannabis sativa, glycine max, xanthium strumarium*, and *saccharum*.

6. The mobile rig of claim 1, wherein the light sources comprise a plurality of light emitting diode (LED) light sources, the LED light sources being at least one of: polarized, plane-polarized, circularly polarized, elliptically polarized, unpolarized, and collimated.

7. The mobile rig of claim 1, wherein the processing circuitry of the control circuit is further configured to:
   control a constant rate at which the mobile rig is moved, as determined and input to the processing circuitry by a user, the constant rate being determined as a function of at least one aspect of a design of the mobile rig, at least one attribute of the light sources utilized in the mobile rig, an intensity of the light sources, a type of the short-day plant, and at least one aspect of a current nighttime condition.

8. The mobile rig of claim 1, wherein the processing circuitry of the control circuit is further configured to cause the mobile rig to move from a first position to a second position in the open field.

9. The mobile rig of claim 1, wherein the support structure is a main rig arm, the light sources being coupled to an underside of the main rig arm.

10. A system for controlling a photoperiodic response of at least one photoperiodically sensitive plant subject planted in an open field, comprising:
    a mobile rig, comprising:
      a support structure;
      a plurality of wheels;
      a plurality of light sources attached to at least the support structure at a position for emitting light on an upper surface of the at least one photoperiodically sensitive plant subject; and
    a control circuit coupled to the mobile rig, the control circuit comprising processing circuitry configured to:
      control operation of the wheels to cause the mobile rig to travel across the open field having the at least one photoperiodically sensitive plant subject planted therein; and
      selectively illuminate the at least one photoperiodically sensitive plant subject using the light sources attached to the mobile rig during nighttime hours in a wavelength range between approximately 250 nm and approximately 800 nm while the mobile rig navigates the open field to control the photoperiodic response of the at least one photoperiodically sensitive plant subject planted therein,
      wherein the at least one photoperiodically sensitive plant subject is a short-day plant and selectively illuminating the short-day plant comprises selectively illuminating the short-day plant with a flash of light of about 1 millisecond, about 1 second, about 2 minutes, about 3 minutes, about 5 minutes, about 10 minutes, about 15 minutes, or about 30 minutes.

11. The system of claim 10, wherein:
    the mobile rig further comprises an irrigation system positioned thereon, the irrigation system comprising a plurality of sprinklers; and
    the processing circuitry of the control circuit is further configured to selectively illuminate the at least one photoperiodically sensitive plant subject after an irrigation of the at least one photoperiodically sensitive plant subject performed using the irrigation system, the irrigation not being performed more than 24 hours prior to the selective illumination of the at least one photoperiodically sensitive plant subject.

12. The system of claim 10, wherein the processing circuitry of the control circuit is further configured to selectively illuminate the short-day plant by selectively controlling, by the control circuit of the mobile rig, the photoperiodic response of the at least one photoperiodically sensitive plant subject using the light sources by selectively emitting the light in the wavelength range for about 3 minutes to about 15 minutes.

13. The system of claim 10, wherein the processing circuitry of the control circuit is further configured to selectively control the photoperiodic response of the at least one photoperiodically sensitive plant subject using the light sources by selectively emitting the light in the wavelength range for about 3 minutes to about 15 minutes.

14. The system of claim 10, wherein the short-day plant comprises one of: *Stevia rebaudiana, artemisia annua, oryza, crocus sativus, chrysanthemum* (morfolium), *dendranthema grandiflora, kalanchoe blossfeldiana, euphorbia pulcherrima, pharbitis* nil, *Cannabis sativa, glycine max, xanthium strumarium,* and *saccharum.*

15. The system of claim 10, wherein the light sources comprise a plurality of light emitting diode (LED) light sources, the LED light sources being at least one of: polarized, plane-polarized, circularly polarized, elliptically polarized, unpolarized, and collimated.

16. The system of claim 10, wherein the processing circuitry of the control circuit is further configured to:
control a constant rate at which the mobile rig is moved, as determined and input to the processing circuitry by a user, the constant rate being determined as a function of at least one aspect of a design of the mobile rig, at least one attribute of the light sources utilized in the mobile rig, an intensity of the light sources, a type of the short-day plant, and at least one aspect of a current nighttime condition.

17. The system of claim 10, wherein the processing circuitry of the control circuit is further configured to cause the mobile rig to move from a first position to a second position in the open field.

18. The system of claim 10, wherein the support structure is a main rig arm, the light sources being coupled to an underside of the main rig arm.

* * * * *